United States Patent
Ruh et al.

(10) Patent No.: US 11,278,964 B2
(45) Date of Patent: Mar. 22, 2022

(54) MONOLITHIC PARTICLE SEPARATORS

(71) Applicant: The Boeing Company, Chicago, IL (US)

(72) Inventors: Anthony Ruh, Seattle, WA (US); Altagracia Saldana, Everett, WA (US); Matthew H. Russell, Gilbert, AZ (US); David E. Stafford, Mesa, AZ (US)

(73) Assignee: The Boeing Company

( * ) Notice: Subject to any disclaimer, the term of this patent is extended or adjusted under 35 U.S.C. 154(b) by 270 days.

(21) Appl. No.: 16/598,269

(22) Filed: Oct. 10, 2019

(65) Prior Publication Data

US 2021/0107058 A1 Apr. 15, 2021

(51) Int. Cl.
| | | |
|---|---|---|
| *B01D 39/00* | (2006.01) | |
| *B22F 10/00* | (2021.01) | |
| *B01D 45/16* | (2006.01) | |
| *B33Y 10/00* | (2015.01) | |
| *F02C 7/04* | (2006.01) | |
| *B33Y 80/00* | (2015.01) | |

(52) U.S. Cl.
CPC .............. *B22F 10/00* (2021.01); *B01D 45/16* (2013.01); *B33Y 10/00* (2014.12); *B33Y 80/00* (2014.12); *F02C 7/04* (2013.01); *F05D 2220/30* (2013.01)

(58) Field of Classification Search
CPC ...... B22F 10/00; B22F 2999/00; B22F 5/009; B22F 5/06; B22F 5/106; B22F 10/28; B01D 45/16; B01D 45/12; B33Y 10/00; B33Y 80/00; F02C 7/04; F02C 7/052; F05D 2220/30; F05D 2220/329; F05D 2230/31; F05D 2230/51; F05D 2230/53; F05D 2230/72; Y02P 10/25
See application file for complete search history.

(56) References Cited

U.S. PATENT DOCUMENTS

| | | | | |
|---|---|---|---|---|
| 3,407,575 | A | * 10/1968 | Krizman | B01D 45/16 55/448 |
| 3,421,296 | A | 1/1969 | Beurer, Sr. | |
| 3,526,082 | A | * 9/1970 | Thuillier | B01D 45/16 96/302 |
| 3,713,280 | A | * 1/1973 | Keller | B04C 3/00 55/360 |
| 3,884,660 | A | * 5/1975 | Perry, Jr. | B01D 45/12 55/396 |
| 4,242,115 | A | * 12/1980 | Harold | B01D 45/16 55/347 |
| 4,279,624 | A | * 7/1981 | Wilson | B01D 45/16 209/710 |
| 4,311,494 | A | * 1/1982 | Conner | B01D 45/16 55/394 |
| 4,514,193 | A | * 4/1985 | Booth | B01D 45/16 55/290 |

(Continued)

*Primary Examiner* — Dung H Bui
(74) *Attorney, Agent, or Firm* — Duft & Bornsen, PC

(57) ABSTRACT

In one embodiment, a monolithic array of particle separators is described that is formed as a single component using an additive manufacturing process. The array may be used as building blocks to generate any sized array of inlet particle separators for jet engines (e.g., a gas turboshaft engine for a helicopter) as desired. If damage occurs to the inlet array during operation of the engine, the modular construction of the inlet array enables the damaged block(s) to be replaced with new blocks, thereby reducing downtime of the aircraft.

34 Claims, 14 Drawing Sheets

(56) References Cited

U.S. PATENT DOCUMENTS

| | | | | |
|---|---|---|---|---|
| 4,746,340 | A * | 5/1988 | Durre | B01D 45/12 |
| | | | | 55/347 |
| 4,985,058 | A | 1/1991 | Prinsloo et al. | |
| 2005/0022484 | A1 * | 2/2005 | Krisko | B01D 50/002 |
| | | | | 55/337 |
| 2007/0251383 | A1 * | 11/2007 | Mueller | B01D 50/008 |
| | | | | 95/216 |
| 2007/0295209 | A1 * | 12/2007 | Strauser | B04C 3/04 |
| | | | | 95/271 |
| 2008/0028940 | A1 * | 2/2008 | Han | B04C 5/28 |
| | | | | 96/417 |
| 2009/0139192 | A1 * | 6/2009 | Sams | B01D 45/12 |
| | | | | 55/418 |
| 2010/0275561 | A1 * | 11/2010 | Lundquist | B04C 3/00 |
| | | | | 55/456 |
| 2011/0048696 | A1 * | 3/2011 | Holte | E21B 43/124 |
| | | | | 166/105.5 |
| 2013/0081368 | A1 * | 4/2013 | Mueller | B01D 45/16 |
| | | | | 55/391 |
| 2013/0199137 | A1 * | 8/2013 | Hallgren | B04C 5/22 |
| | | | | 55/393 |
| 2013/0312609 | A1 * | 11/2013 | van Vorselen | B07B 7/00 |
| | | | | 95/268 |
| 2014/0298761 | A1 * | 10/2014 | Ackermann | B01D 45/16 |
| | | | | 55/457 |
| 2014/0373490 | A1 * | 12/2014 | Wuebbeling | B01D 45/08 |
| | | | | 55/345 |
| 2016/0177893 | A1 * | 6/2016 | Finn | F02M 35/024 |
| | | | | 95/23 |
| 2021/0060582 | A1 * | 3/2021 | Son | B04C 5/103 |

* cited by examiner

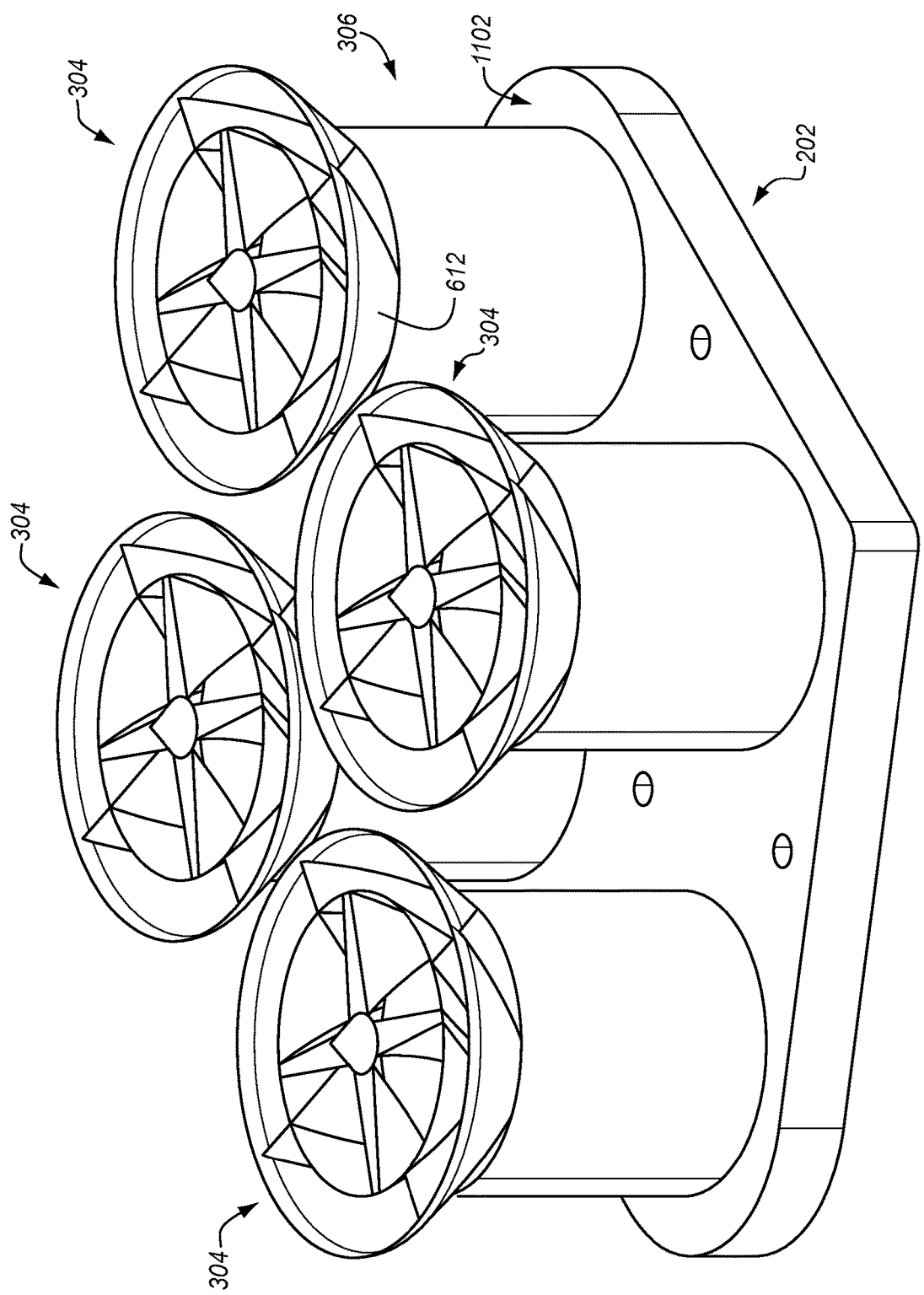

MONOLITHIC PARTICLE SEPARATORS

FIELD

This disclosure relates to the field of aircraft engines and, in particular, to removing particulate debris from air bound for a turbine inlet.

BACKGROUND

Modern turbine jet engines can suffer major damage when foreign objects are sucked into the inlet of the turbine. Particulate matter, such as sand, dust, ice, salt water, wet snow, etc., ingested by the turbine can cause compressor erosion, turbine blade glazing and/or erosion, turbine blade vibration and fatigue problems, and/or block blade cooling passages. In particular, jet helicopters can experience brownout conditions, which occurs when the rotor wash of the helicopter kicks up a cloud of dust during take-off and landings. Brownout can cause accidents during helicopter take-off and landing operations in desert terrain, dust storms, or during operations proximate to the ground. Further, in certain conditions, where water accumulates on the fuselage of a helicopter at a point upstream of the turbine air inlet, a mere half cup of water ingested as a slug may be sufficient to cause the jet engine to flame out.

SUMMARY

A monolithic array of particle separators is described that is formed as a single component using an additive manufacturing process. The array may be used as building blocks to generate any sized array of inlet particle separators for jet aircraft (e.g., a helicopter) as desired. If damage occurs to the inlet array during operation of the engine, the modular construction of the inlet array enables the damaged block(s) to be swapped out with new blocks, thereby reducing downtime of the aircraft.

One embodiment comprises a method of additively forming a monolithic array of particle separators. The method comprises additively forming, using a first series of manufacturing steps, a base plate that includes a top surface, a bottom surface, and a plurality of first apertures extending through the base plate from the top surface to the bottom surface. The method further comprises additively forming, using a second series of the manufacturing steps, a plurality of first cylindrical walls, each formed at a perimeter of one of the first apertures and vertically extending from the top surface to terminate at a first end. The method further comprises additively forming, using a third series of the manufacturing steps, a plurality of conical walls, each formed on the first end of one of the first cylindrical walls and vertically extending from the first end away from the top surface and surrounding a first portion of a helical shape, wherein each of the conical walls increases in diameter away from the top surface and terminates at a second end, wherein each of the conical walls includes at least one second aperture that extends through a side wall. The method further comprises additively forming, using a fourth series of the manufacturing steps, a plurality of second cylindrical walls, each formed on the second end of one of the conical walls and vertically extending from the second end away from the top surface, wherein each of the second cylindrical walls surrounds a second portion of the helical shape.

In an aspect of the method, the at least one second aperture has a shape of a triangle.

In an aspect of the method, the base of the triangle is proximate to the first end of the first cylindrical walls.

In an aspect of the method, the helical shape comprises a plurality of fins that extend along a centerline of the second cylindrical walls.

In an aspect of the method, the manufacturing steps comprise additively forming features using direct metal laser sintering.

In an aspect of the method, the helical shape terminates at an inside surface of the conical walls between two or more of the at least one second aperture.

Another embodiment comprises an apparatus that includes a base plate, a plurality of first cylindrical walls, a plurality of conical walls, and a plurality of second cylindrical walls. The base plate includes a top surface, a bottom surface, and a plurality of first apertures extending through the base plate from the top surface to the bottom surface. Each of the plurality of first cylindrical walls are seamlessly integrated around a perimeter of one of the first apertures and vertically extend from the top surface to terminate at a first end. Each of the plurality of conical walls are seamlessly integrated onto the first end of one of the first cylindrical walls and vertically extend from the first end away from the top surface and surrounding a first portion of a helical shape, where each of the conical walls increases in diameter away from the top surface and terminates at a second end, and where each of the conical walls includes at least one second aperture that extends through a side wall. Each of the plurality of second cylindrical walls are seamlessly integrated onto the second end of one of the conical walls and vertically extend from the second end away from the top surface, where each of the second cylindrical walls surrounds a second portion of the helical shape.

In an aspect of the apparatus, the at least one second aperture has a shape of a triangle.

In an aspect of the apparatus, a base of the triangle is proximate to the first end of the first cylindrical walls.

In an aspect of the apparatus, the helical shape comprises a plurality of fins that extend along a centerline of the second cylindrical walls.

In an aspect of the apparatus, the first apertures have a diameter between 0.5 inches and 1 inch.

In an aspect of the apparatus, the second cylindrical walls have an inside diameter between 0.75 inches and 1.25 inches.

In an aspect of the apparatus, the helical shape rotates approximately 180 degrees along its length.

In an aspect of the apparatus, the helical shape terminates at an inside surface of the conical walls between two or more of the at least one second aperture.

Another embodiment comprises a method of additively forming a monolithic particle separator. The method comprises additively forming, using a first series of manufacturing steps, a first cylindrical wall extending along a length to terminate at a first end. The method further comprises additively forming, using a second series of the manufacturing steps, a conical wall on the first end of the first cylindrical wall that vertically extends from the first end and surrounds a first portion of a helical shape, wherein the conical wall increases in diameter away from the first end and terminates at a second end, wherein the conical wall includes at least one aperture that extends through a side wall. The method further comprises additively forming, using a third series of the manufacturing steps, a second cylindrical wall on the second end of conical wall that vertically extends from the second end and surrounds a second portion of the helical shape.

In an aspect of the method, the at least one aperture has a shape of a triangle.

In an aspect of the method, the base of the triangle is proximate to the first end of the first cylindrical wall.

In an aspect of the method, the helical shape comprises a plurality of fins that extend along a centerline of the second cylindrical wall.

In an aspect of the method, the manufacturing steps comprise additively forming features using direct metal laser sintering.

In an aspect of the method, the helical shape terminates at an inside surface of the conical wall between two or more of the at least one aperture.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

FIGS. 13-14 are isometric views of the monolithic array of particle separators of FIG. 9 during various stage of fabrication in an illustrative embodiment.

DETAILED DESCRIPTION

Figure 1:
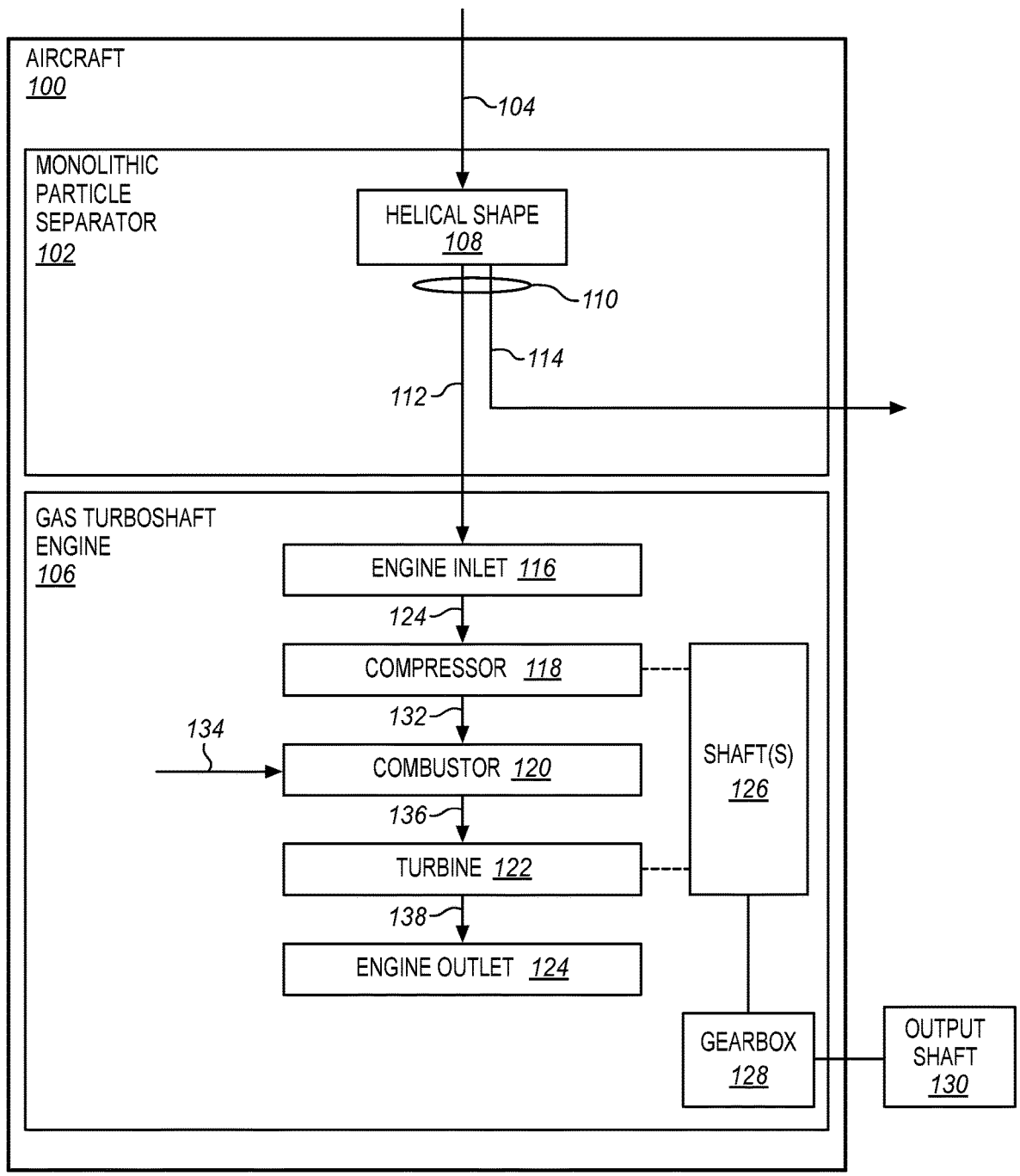
FIG. 1 is a block diagram of a monolithic particle separator in an illustrative embodiment.

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Existing gas cleaning devices for jet engines typically consist of a plurality of particle separators that are arranged in an array, with each particle separator contributing to a portion of the gas cleaning process. Each particle separator may consist of a plurality of parts that are designed, manufactured, procured, accounted for, and ultimately, assembled together to form an individual particle separator. After assembling the individual particle separators, the individual particle separators are assembled into an array of separators.

During operation of aircraft utilizing gas cleaning devices for turbines (e.g., helicopters), one or more of the particle separators may become damaged due to foreign objects being sucked into the separators. For example, a helicopter hovering close to the ground may kick up rocks or other larger-than-normal foreign objects, which may be sucked into the separators at a high rate of speed. The result of this action is that one or more of the separators in the array may become permanently damaged, thereby requiring disassembly of at least a portion of the array to replace the damaged separator.

The present disclosure solves these and other problems associated with current gas cleaning devices for aircraft by providing a monolithic particle separator that is fabricated using an Additive Manufacturing (AM) process (e.g., Direct Metal Laser Sintering (DMLS). The monolithic particle separator comprises a single AM formed component, in contrast to the multiple components used in previous particle separators, thereby reducing complexity and part count. Further, a cluster of the monolithic particle separator may be fabricated as a single AM component, which simplifies assembly of multiple separators into an array of separators using a plurality of the clusters as the building blocks.

DMLS is a direct metal laser melting (DMLM) or laser powder bed fusion (LPBF) technology that accurately forms complex geometries not possible with other metal manufacturing methods. DMLS is a rapid prototyping, 3D printing, or additive manufacturing technique designed to use a high power-density laser to melt and fuse metallic powders together. DMLS uses a variety of alloys, allowing prototypes to be functional hardware made out of the same material as production components. Since the components are built layer by layer, it is possible to design organic geometries, internal features and challenging passages that could not be cast or otherwise machined. DMLS produces strong, durable metal parts that work well as both functional prototypes or end-use production parts.

The process starts by using 3D CAD file processing software to define printing parameters for the part, and slicing the part into layers of from 20 to 100 micrometers thick. With DMLS, thin 2D layers of atomized fine metal powder are evenly distributed using a coating mechanism onto a substrate plate, usually metal, that is fastened to an indexing table that moves in the vertical (Z) axis. This takes place inside a chamber containing a tightly controlled atmosphere of inert gas, either argon or nitrogen at oxygen levels below, for example, 500 parts per million. Once a layer of powder has been distributed, it is fused by selectively melting the powder in the prescribed 2D outline. This is accomplished with a high-power laser beam, usually an ytterbium fiber laser of around a hundred watts. The laser beam is directed in the X and Y directions with two high frequency scanning mirrors. The laser energy is intense enough to permit full melting (welding) of the particles to form solid metal. The process is repeated layer after layer until the part is complete.

DMLS has many benefits over traditional manufacturing techniques. The ability to quickly produce a unique part is the most obvious because no special tooling is required and the parts can be built in a matter of hours. Additionally, DMLS allows for more rigorous testing of prototypes because of its inherent strength. Since the components are built layer by layer, it is possible to design internal features and passages that could not be cast or otherwise machined. Complex geometries and assemblies with multiple components can be simplified to a few parts with a more cost-effective assembly. Further, since DMLS does not require special tooling like castings, it is convenient for short production runs. DMLS parts are often heat-treated after production to increase their strength.

As DMLS can use most alloys, prototypes can be functional hardware made out of the same material as the production components. Some of the materials being used in this process can include copper, aluminum, stainless steel, tool steel, cobalt chrome, titanium and tungsten.

FIG. 1 is a block diagram of a monolithic particle separator 102 in an illustrative embodiment. In this embodiment, separator 102 removes particulate matter from contaminated air 104 that is bound for a gas turboshaft engine 106 of an aircraft 100, thereby preventing damage to engine 106 from dust, sand, ice, or other types of particulate matter that may be entrained within contaminated air 104. Separator 102 therefore comprises any component, system, or device that removes particulate matter from an airstream prior to the airstream being provided to engine 106. In some embodiments, a differential pressure is formed across separator 102 based on a suction generated by engine 106, which passively promotes an airflow through separator 102. In some embodiments, aircraft 100 comprises a helicopter, and engine 106 provides mechanical power to spin a main rotor and/or tail rotor of a helicopter.

In this embodiment, separator 102 includes a helical shape 108, which receives contaminated air 104, and rotates or swirls contaminated air 104 to generate a composite airstream 110 comprising clean air 112 and particulate-rich air 114 based on a centrifugal force generated on the particles as contaminated air 104 rotates. In particular, helical shape 108 comprises any component, system, or device that receives contaminated air 104 and generates a composite airstream 110. Particulate-rich air 114 is ejected from separator 102, and clean air 112 is provided to an engine inlet 116 of engine 106.

Engine 106, upon receiving clean air 112 from separator 102, is spared the potential damage that may occur from directly ingesting contaminated air 104 at engine inlet 116. Thus, the process of removing particulate contamination from contaminated air 104 improves the reliability and long-term performance of engine 106, reducing maintenance cost of engine 106 over time.

In this embodiment, engine 106 includes a compressor 118, a combustor 120, a turbine 122, and an engine outlet 124. Both compressor 118 and turbine 122 are coupled to one or more shafts 126. A gearbox 128 is coupled to one or more shafts 126 and an output shaft 130. Output shaft 130 drives a main rotor and/or tail rotor of a helicopter (not shown).

Compressor 118 draws in clean air 112 provided by separator 102, and compresses clean air 112 to generate compressed clean air 132. Compressor 118 may consist of an axial compressor, a centrifugal compressor, or combination of the two. An axial compressor consists of two main elements: a rotor and a stator (not shown). The rotor consists of a number of blades fixed on a rotating spindle and resembles a fan. As the rotor turns, clean air 112 is drawn into engine inlet 116 and Compressor 118. Stator vanes (not shown) are arranged in fixed rows between the rotor blades and act as a diffuser at each stage to decrease air velocity and increase air pressure. There may be a number of rows of rotor blades and stator vanes. Each row constitutes a pressure stage, and the number of stages depends on the amount of air and pressure rise required for the particular engine.

A centrifugal compressor consists of an impeller, diffuser, and a manifold (not shown). The impeller, which may be a forged disc with integral blades, rotates at a high speed to draw in clean air 112 and expel it at an accelerated rate. Clean air 112 then passes through the diffuser, which slows clean air 112 down. When the velocity of clean air 112 is slowed, static pressure increases, resulting in compressed clean air 132. Compressed clean air 132 then passes through the compressor manifold where it is distributed to combustor 120 via discharge tubes.

Compressed clean air 132 is mixed with a fuel 134 in combustor 120. An igniter (not shown) ignites the mixture of compressed clean air 132 and fuel 134, which generates hot gas 136. Hot gas 136 is provided to turbine 122, which may comprise a series of turbine stages. A two-stage turbine consists of a series of turbine wheels that are used to drive Compressor 118 and other components attached to gearbox 128. Both stages may consist of one or more turbine wheels. The first stage is usually referred to as the gas producer (N1 or NG) while the second stage is commonly called the power turbine (N2 or NP). (The letter N is used to denote rotational speed.)

If the first and second stage turbines are mechanically coupled to each other, then the system is said to be a direct-drive engine or fixed turbine. These engines share a common shaft (e.g., shaft 126), which means that the first and second stage turbines, and thus Compressor 118 and output shaft 130, are connected. On most turbine assemblies used in helicopters, the first stage and second stage turbines are not mechanically connected to each other. Rather, they are mounted on different shafts (e.g., shafts 126), with one shaft inside the other shaft, that turn freely with respect to each other. This is referred to as a "free turbine". When engine 106 is running and operating as a free turbine, hot gas 136 passes through the first stage turbine (N1) to drive Compressor 118, and then passes through the independent second stage turbine (N2) to drive gearbox 128 and output shaft 130. Exhaust gas 138 from turbine 122 is expelled from engine 106 via engine outlet 124.

Figure 2:
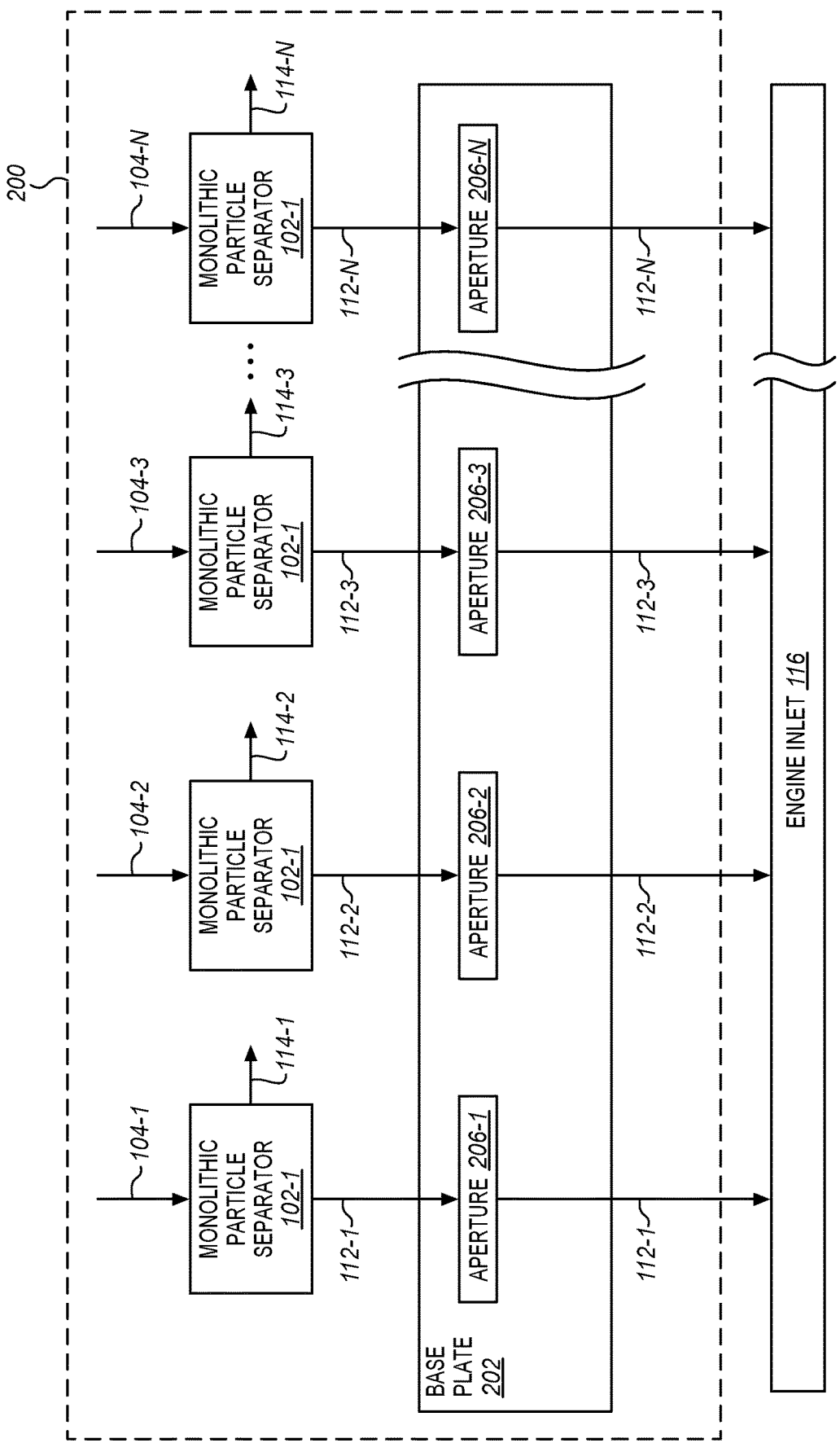
FIG. 2 is a block diagram of a monolithic array of particle separators in an illustrative embodiment.

FIG. 2 is a block diagram of a monolithic array 200 of separators 102 in an illustrative embodiment. In this embodiment, monolithic array 200 includes a plurality of separators 102 fabricated together onto a common base plate 202. Monolithic array 200, similar to separator 102 previously described with respect to FIG. 1, comprises a single component formed by an AM process. In this embodiment, any number of separators 102 may be fabricated together onto base plate 202, thereby allowing monolithic array 200 to be used as a building block to assemble any number of separators 102 together to clean particulate matter from contaminated air 104 and to supply clean air 112 to engine inlet 116 of engine 106.

In this embodiment, monolithic array 200 includes four separators 102 (i.e., separator 102-1, separator 102-2, separator 102-3, and separator 102-n), although monolithic array 200 in other embodiments includes more or fewer separators 102 as a matter of design choice. Each of separators 102 in this embodiment receives a portion of contaminated air 104, discharges a portion of particulate-rich air 114, and supplies a portion of clean air 112 to engine 106. In particular, separator 102-1 receives contaminated air 104-1, discharge particulate-rich air 114-1, and provides clean air 112-1 to engine inlet 116. Separator 102-2 receives contaminated air 104-2, discharges particulate-rich air 114-2, and provides clean air 112-2 to engine inlet 116. Separator 102-3 receives contaminated air 104-3, discharges particulate-rich air 114-3, and provides clean air 112-3 to engine inlet 116, and separator 102-$n$ receives contaminated air 104-$n$, discharges particulate-rich air 114-$n$, and provides clean air 112-$n$ to engine inlet 116.

In this embodiment, separators 102 are seamlessly connected with base plate 202 and in fluid communication with apertures 206 of base plate 202. In particular, separator 102-1 is in fluid communication with aperture 206-1, separator 102-2 is in fluid communication with aperture 206-2, separator 102-3 is in fluid communication with aperture 206-3, and separator 102-$n$ is in fluid communication with aperture 206-$n$. Further in this embodiment, apertures 206 are in fluid communication with engine inlet 116, and supply clean air 112 to engine inlet 116.

Figure 3:
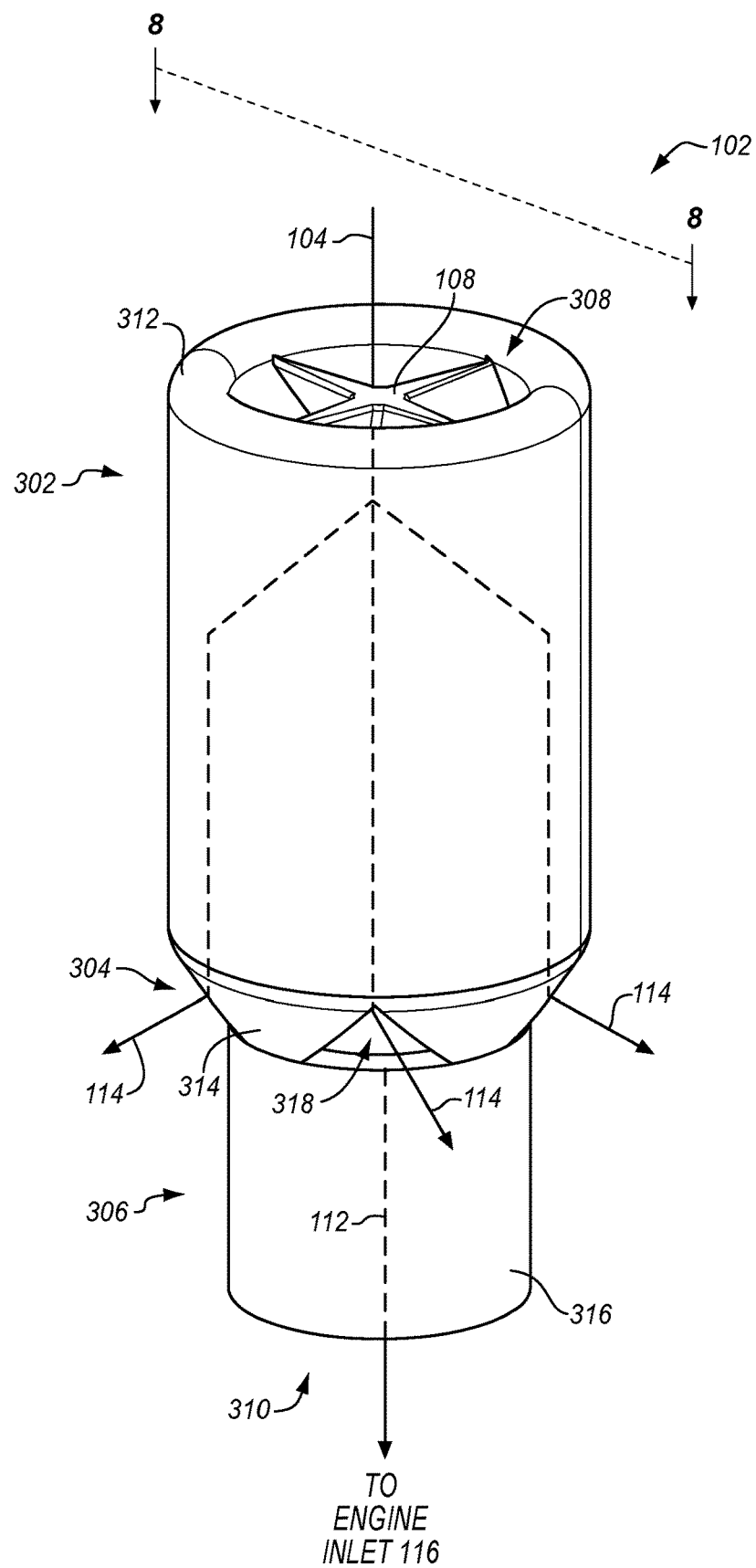
FIG. 3 is an isometric view of a monolithic particle separator in an illustrative embodiment.

FIG. 3 is an isometric view of separator 102 in an illustrative embodiment. FIG. 3 merely represents one possible configuration for separator 102, and other configurations may be implemented as a matter of design choice.

In this embodiment, separator 102 includes an upstream member 302, an ejector member 304, and a downstream member 306. Contaminated air 104 enters end 308 of upstream member 302, and is swirled by helical shape 108 as contaminated air 104 travels towards ejector member 304. Particulate-rich air 114 is ejected from ejector member 304, and clean air 112 travels through downstream member 306 and exits end 310, which is in fluid communication with engine inlet 116.

In this embodiment, upstream member 302 is formed from a cylindrical wall 312, ejector member 304 is formed from a conical wall 314, and downstream member 306 is formed from a cylindrical wall 316. Conical wall 314 of ejector member 304 in this embodiment includes at least one aperture 318, which discharges particulate-rich air 114 from separator 102. In this embodiment, aperture 318 is in the shape of a triangle, although aperture 318 has other shapes in other embodiments.

Figure 4:
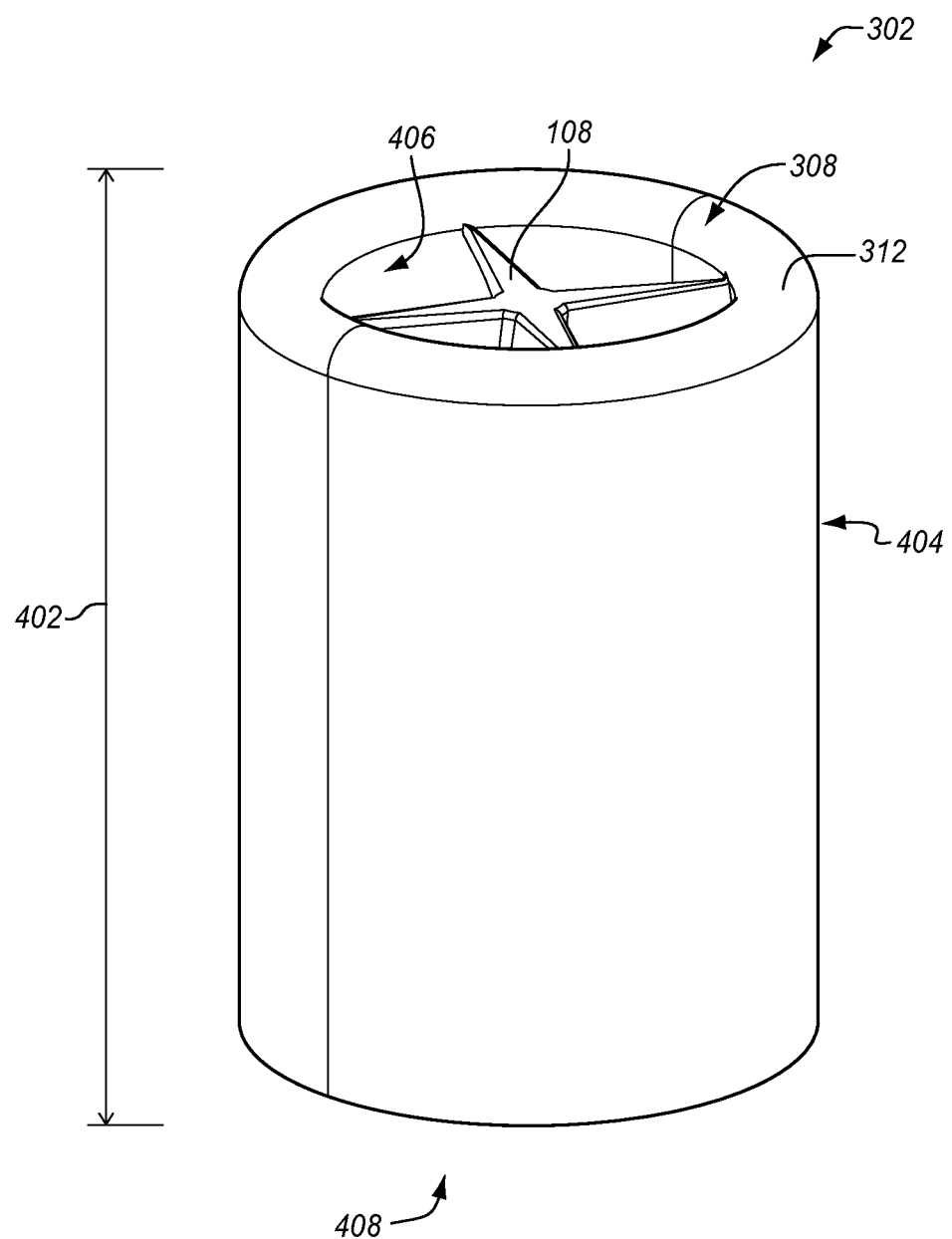
FIGS. 4-7 are isometric views of various portions of the monolithic particle separator of FIG. 3 in illustrative embodiments.

FIG. 4 is an isometric view of upstream member 302 in an illustrative embodiment. Upstream member 302 is in the shape of a cylinder of length 402, with cylindrical wall 312 having an outside surface 404 and an inside surface 406. Inside surface 406 is seamlessly connected to helical shape 108.

Figure 5:
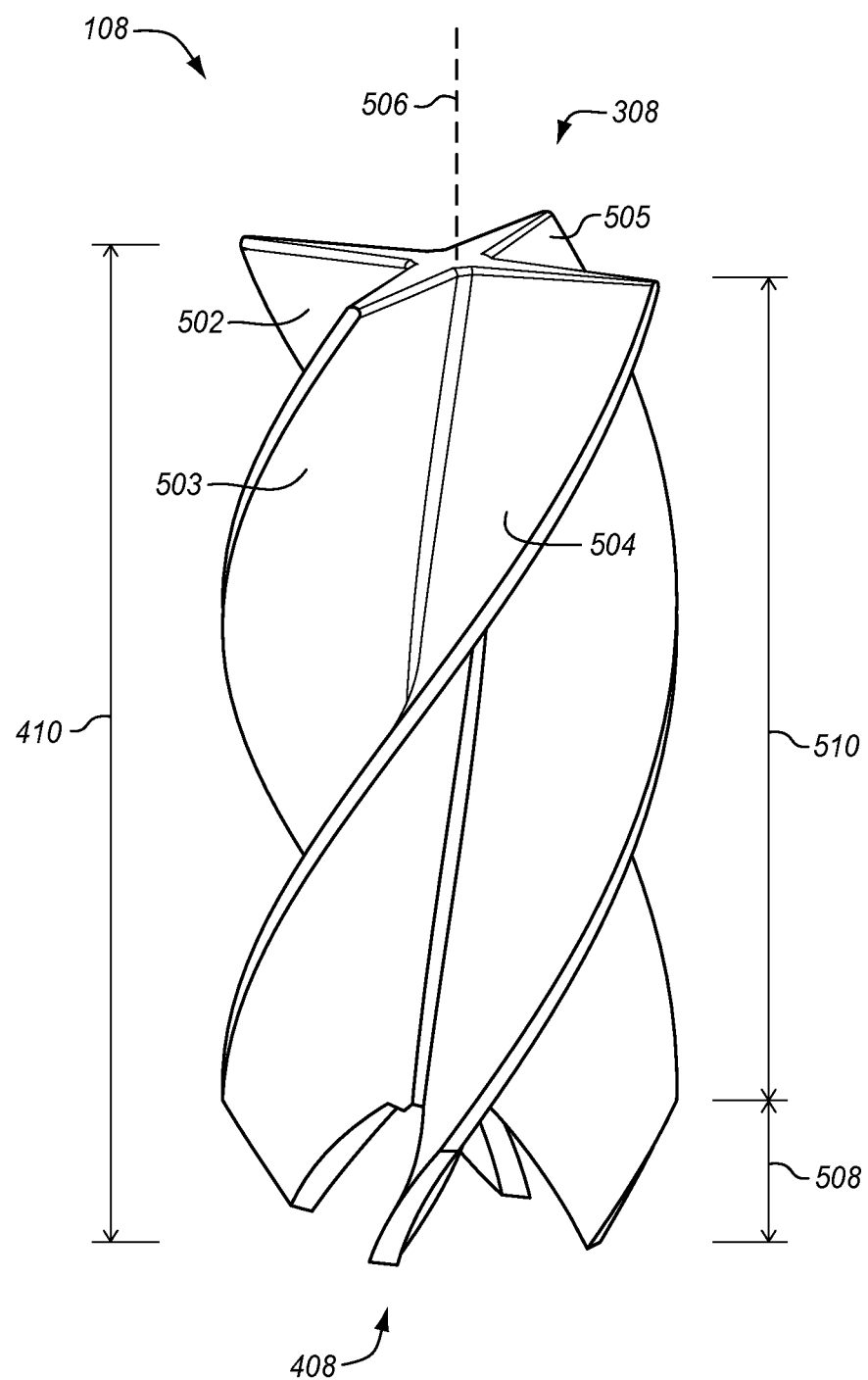

FIG. 5 is an isometric view of helical shape 108 in an illustrative embodiment. In this embodiment, helical shape 108 includes four fins 502-504 that radiate from a centerline 506 of helical shape 108 and cylindrical wall 312, although helical shape 108 includes more of fewer fins 502-504 in other embodiments. In this embodiment, fins 502-505 each rotate ½ of a revolution along length 410 of helical shape 108, although fins 502-505 rotate more or fewer revolutions along length 410 of helical shape 108 in other embodiments. In some embodiments, fins 502-505 rotate at a progressive rate along length 410 of helical shape 108. Helical shape 108 in this embodiment includes a portion 508 that is part of ejector member 304 and a portion 510 that is part of upstream member 302.

Figure 6:
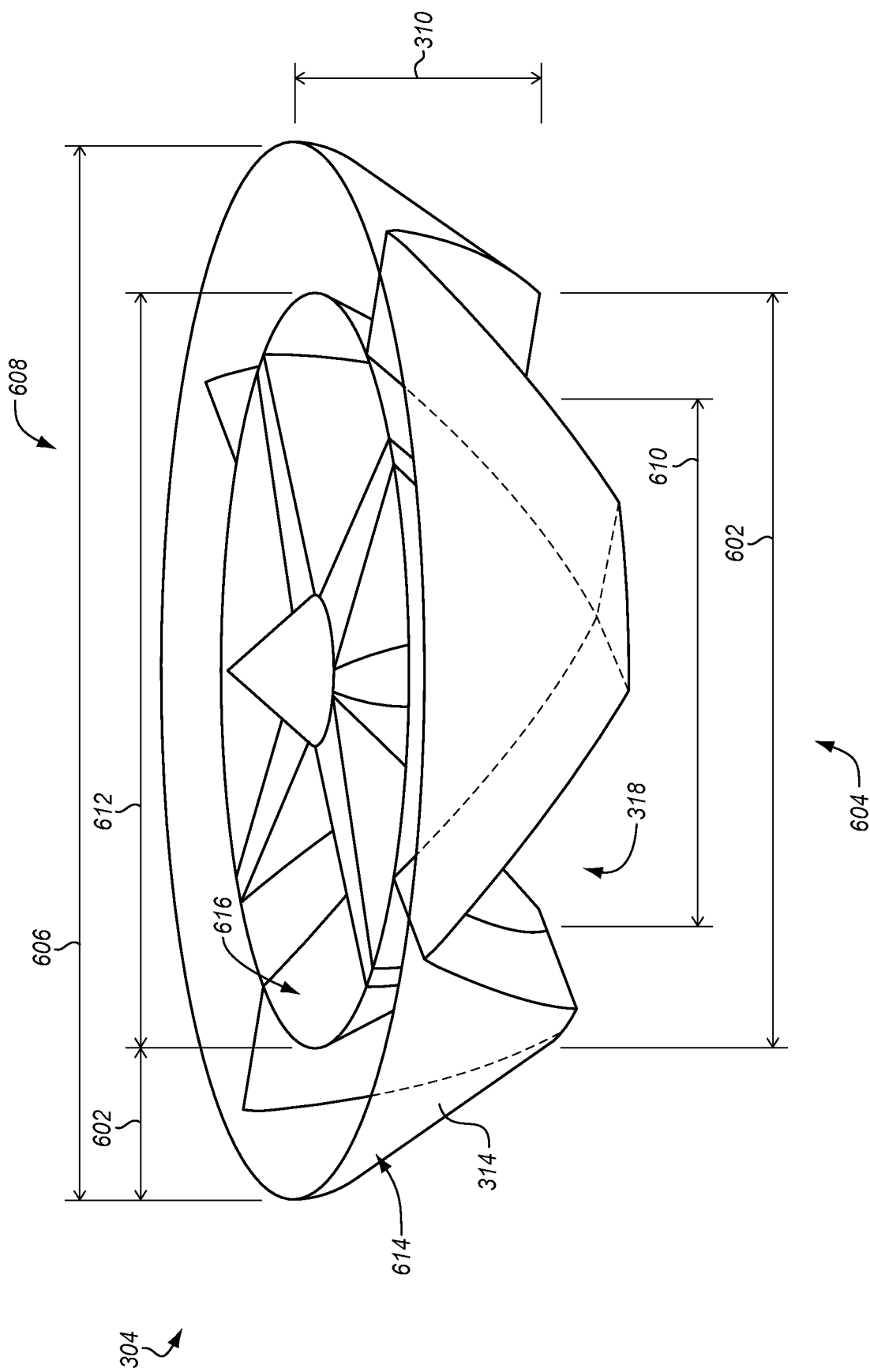

FIG. 6 is an isometric view of ejector member 304 in an illustrative embodiment. In this embodiment, conical wall 314 of ejector member 304 has an outside diameter 602 at end 604 that is smaller than an outside diameter 606 at end 608. Conical wall 314 has an inside diameter 610 at end 604 that is smaller than an inside diameter 612 at end 608. One or more apertures 318 extends through a side wall 614 of conical wall 314. In an embodiment, helical shape 108 terminates at an inside surface 616 of conical walls between two or more of apertures 318.

Figure 7:
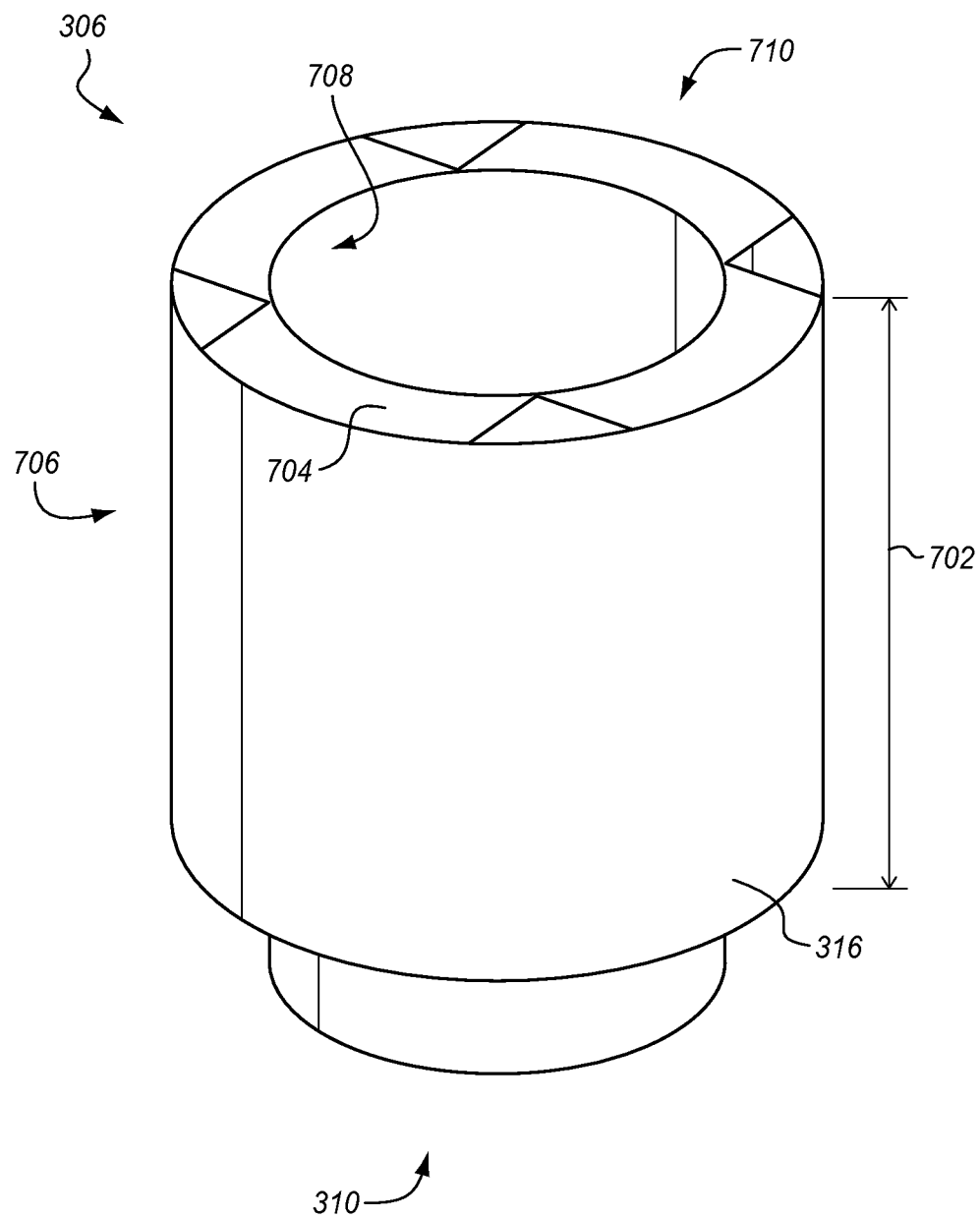

FIG. 7 is an isometric view of downstream member 306 in an illustrative embodiment. In this embodiment, downstream member 306 comprises a cylinder of length 702, having a cylindrical wall 704 with an outside surface 706 and an inside surface 708. Downstream member 306 has an end 710 proximate to end 604 of ejector member 304.

Figure 8:
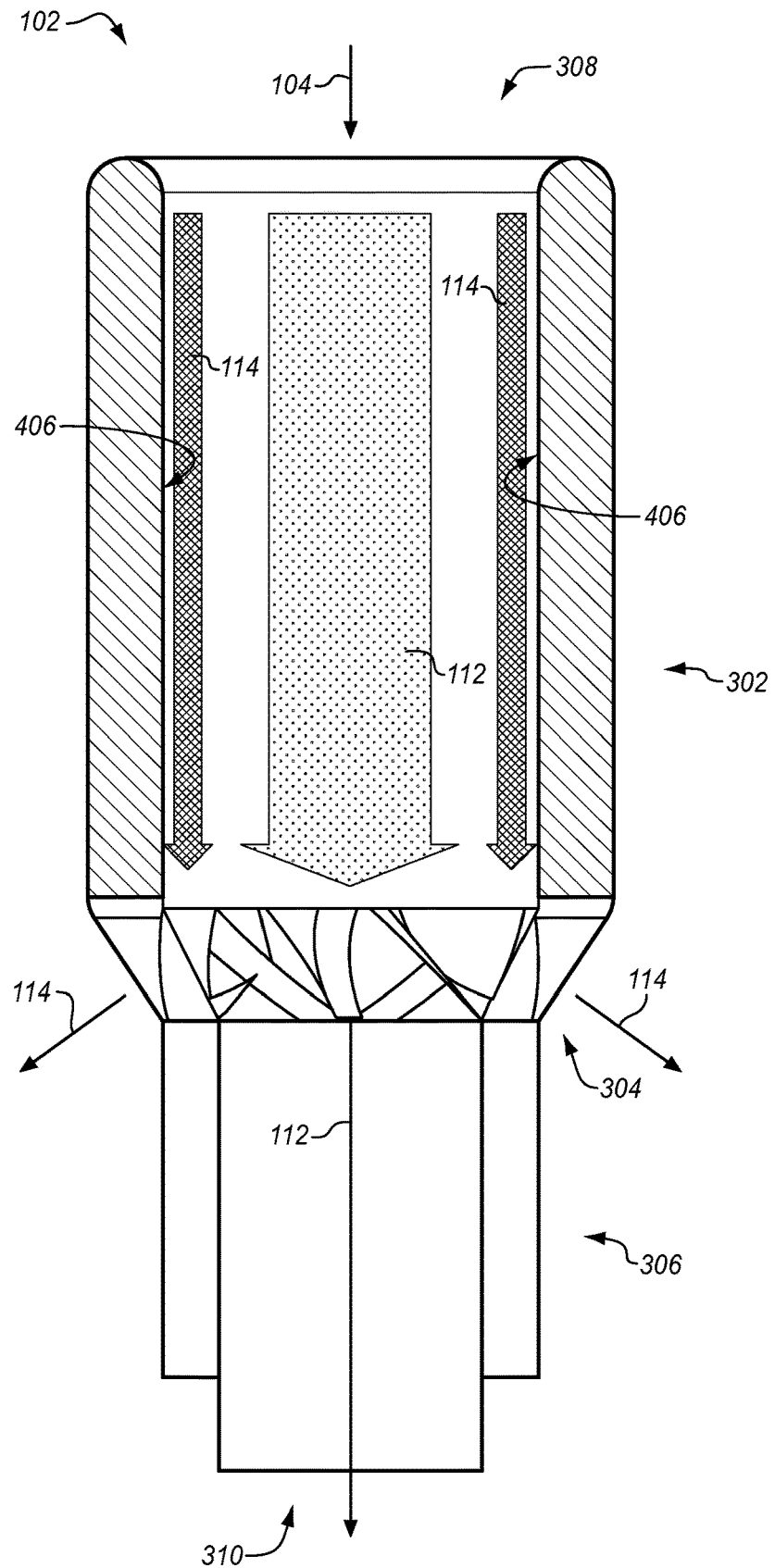
FIG. 8 is a cross-sectional view of the monolithic particle separator along cut lines 1-1 of FIG. 3 in an illustrative embodiment.

FIG. 8 is a cross-sectional view of separator 102 along cut lines 8-8 of FIG. 3 in an illustrative embodiment. During operation of separator 102, contaminated air 104 enters end 308 of upstream member 302, and is swirled by helical shape 108 (not shown in this view) as contaminated air 104 travels towards ejector member 304. Centrifugal force acting on particles in contaminated air 104 causes the particles to move towards inside surface 406 of upstream member 302, to form particulate-rich air 114, which is ejected from ejector member 304. Clean air 112 is formed away from inside surface 406, which is ejected at end 310 of downstream member 306.

Figure 9:
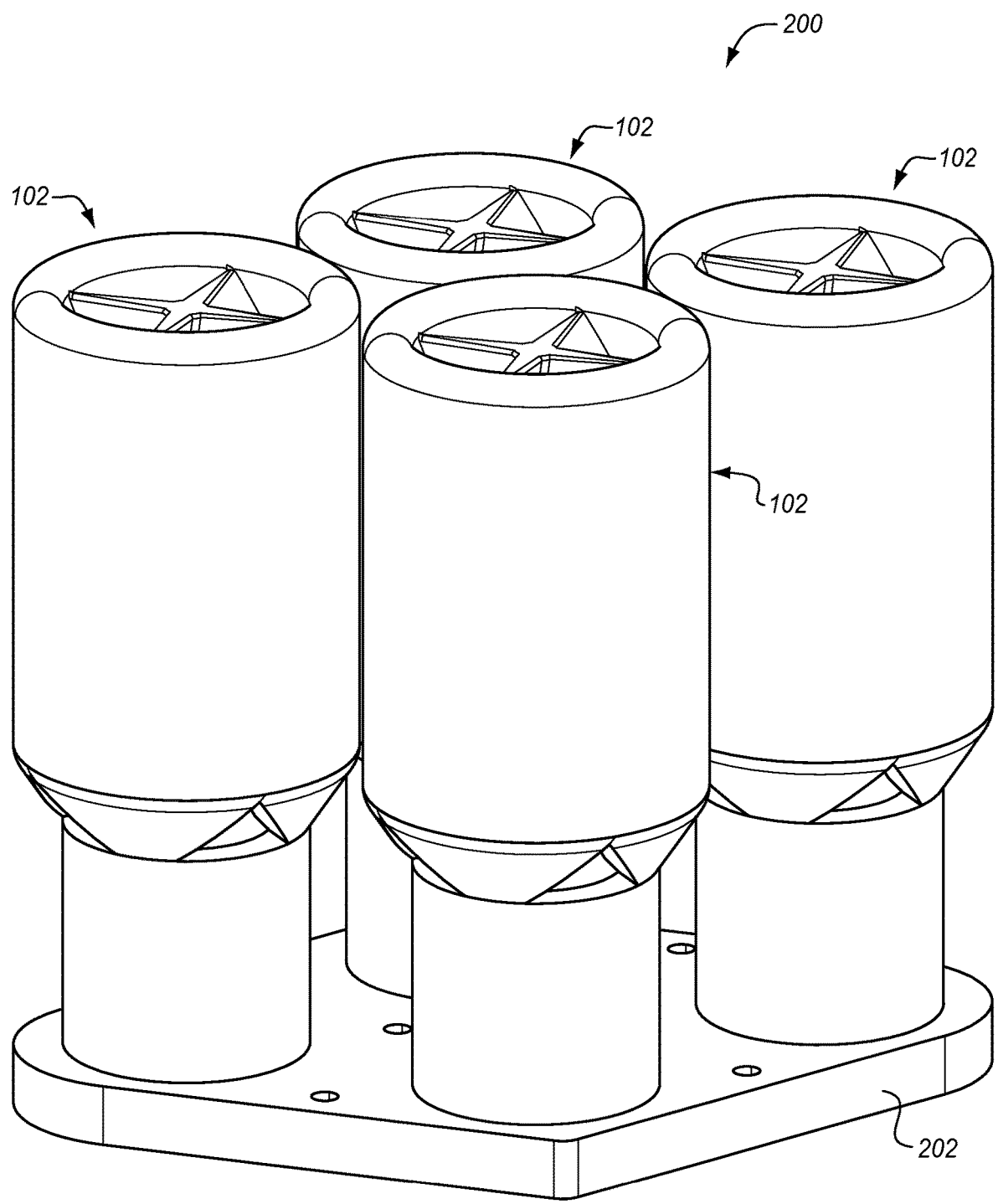
FIG. 9 is a monolithic array of particle separators in an illustrative embodiment.

FIG. 9 is an isometric view of monolithic array 200 of separators 102 in an illustrative embodiment. In this embodiment, monolithic array 200 is formed as a single component utilizing an AM process. Monolithic array 200 includes four separators 102, formed concurrently together on a common base plate 202. Although monolithic array 200 includes four separators 102 in this embodiment, monolithic array 200 includes more or fewer separators 102 in other embodiments. Using monolithic array 200 as a modular element, a plurality of monolithic arrays 200 may be assembled onto a larger inlet assembly for engine 106.

Figure 10:
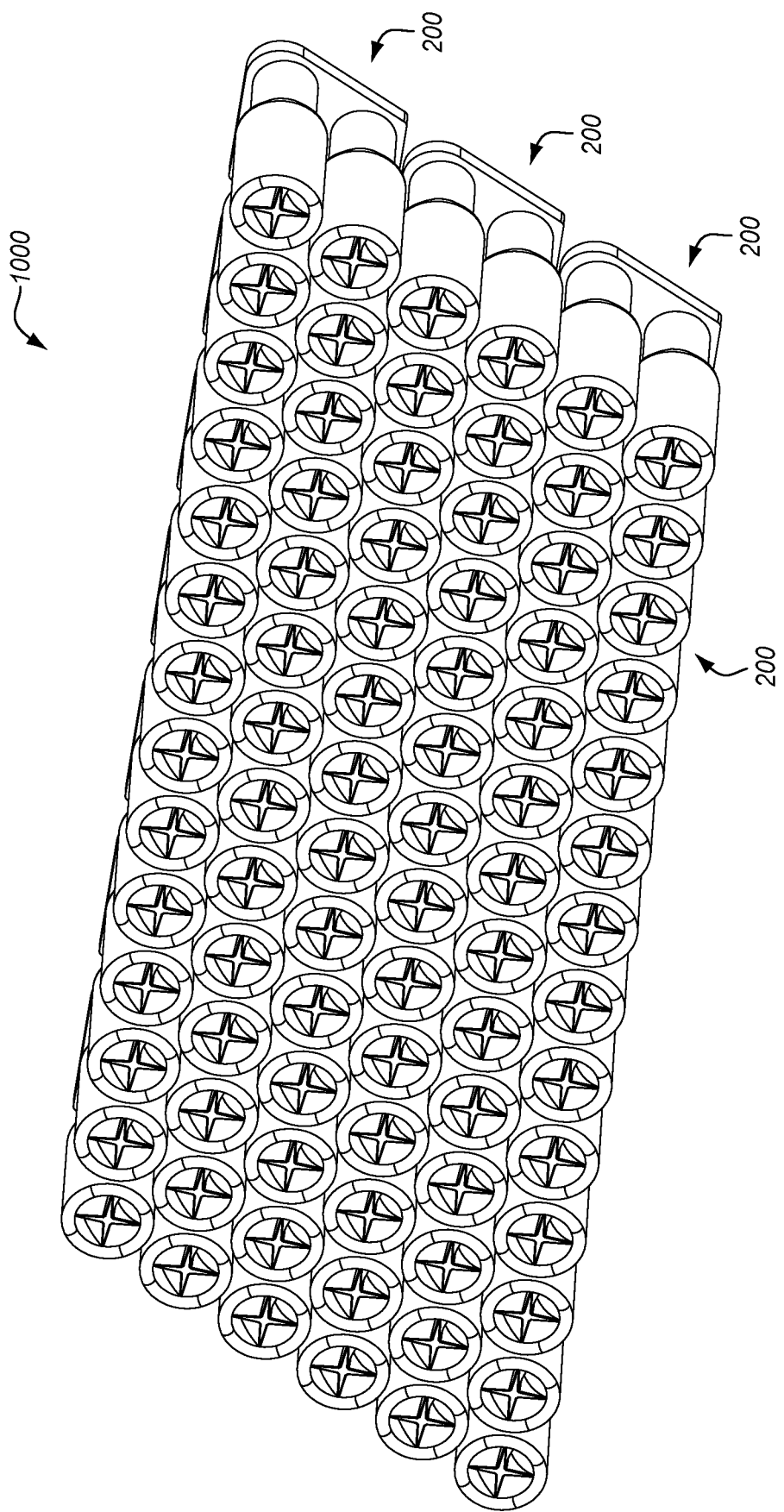
FIG. 10 is an isometric view of an inlet array formed from a plurality of the monolithic array of particle separators of FIG. 9 in an illustrative embodiment.

FIG. 10 is an isometric view of an inlet assembly 1000, which uses a plurality of monolithic arrays 200 as building blocks in an illustrative embodiment. Using monolithic array 200 as building blocks, inlet assembly 1000 may assume a variety of shapes simply by positioning monolithic arrays 200 differently with respect to each other.

Figure 11:
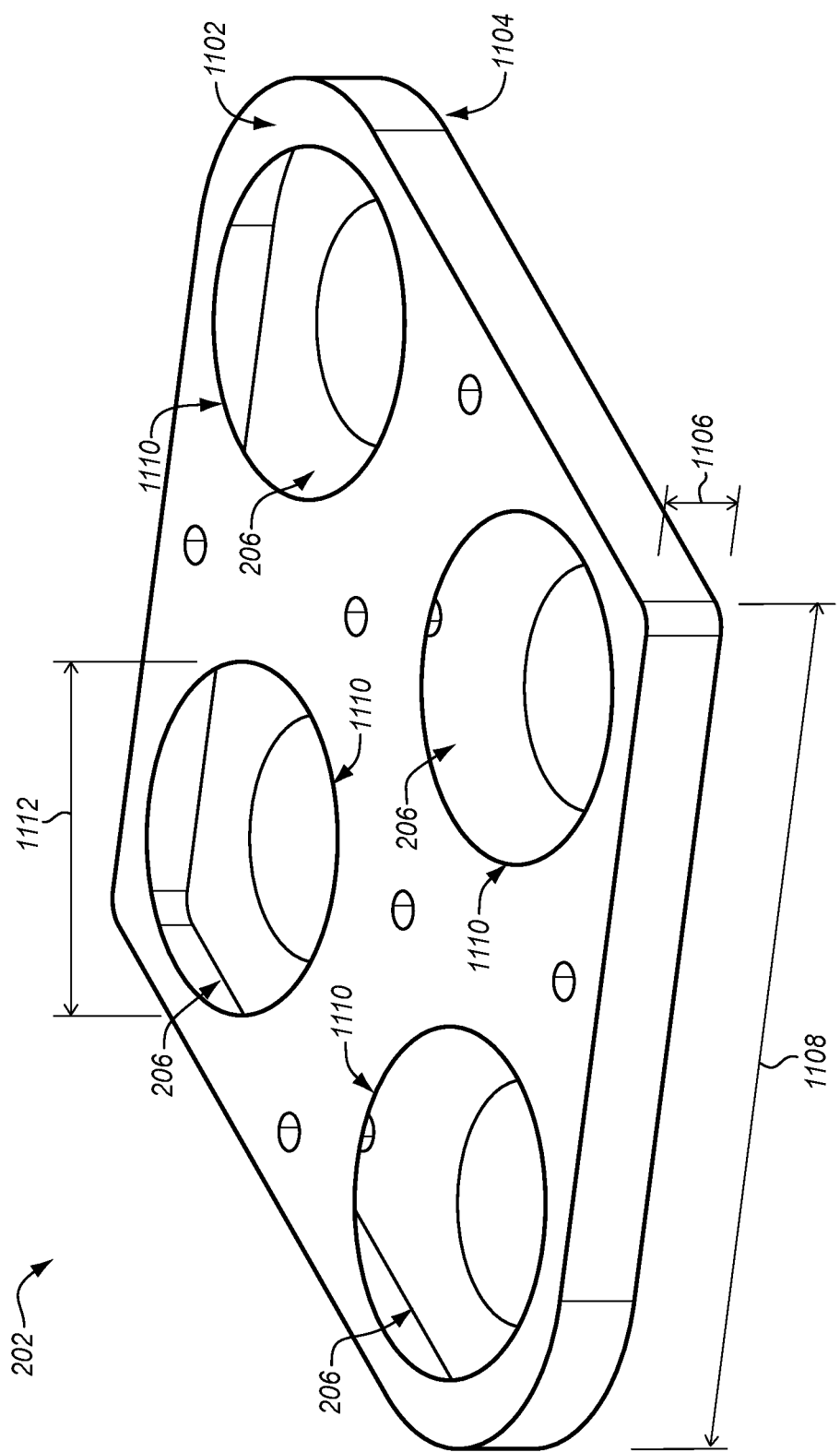
FIG. 11 is a base plate for the monolithic array of particle separators of FIG. 9 in an illustrative embodiment.

FIG. 11 is an isometric view of base plate 202 in an illustrative embodiment. In this embodiment, base plate 202 includes a plurality of apertures 206 extending from a top surface 1102 to a bottom surface 1104. Base plate 202 is substantially square in shape in this embodiment, having a height 1106, and a length 1108 on each side. Apertures 206 have a diameter 1112 and a perimeter 1110.

Figure 12:
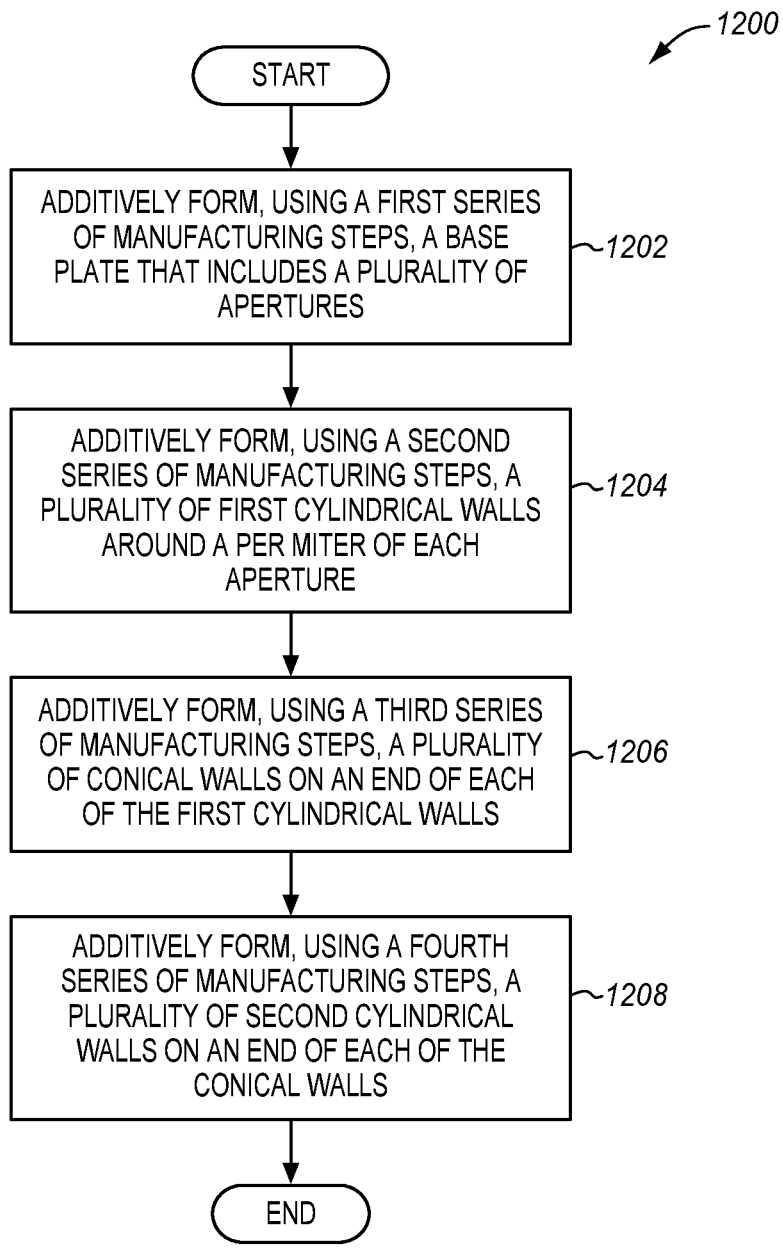
FIG. 12 is a flow chart of a method of additively forming the monolithic array of particle separators of FIG. 9 in an illustrative embodiment.

FIG. 12 is a flow chart of a method 1200 of additively forming monolithic array 200 in an illustrative embodiment. Method 1200 will be described with respect to separator 102 and monolithic array 200 as illustrated in FIGS. 1-12, although method 1200 may apply to other configurations of separator 102 and monolithic array 200 in other configurations. The steps of method 1200 are not all inclusive, and may include other steps not shown. Further, the steps may be performed in an alternate order.

Using an AM process comprising a first series of manufacturing steps (e.g., using DMLS), base plate 202 is formed and includes top surface 1102, bottom surface 1104, and a plurality of apertures 206 extending through base plate 202 from top surface 1102 to bottom surface 1104 (see step 1202). For instance, base plate 202 may be built layer by layer from bottom surface 1104 to top surface 1102, with apertures 206 formed concurrently. FIG. 11 is the result of using the AM process to form base plate 202.

In response to forming base plate 202, the AM process continues through a second series of manufacturing steps to concurrently form a plurality of downstream members 306 on top surface 1102 of base plate 202, each downstream member 306 formed around perimeter 1110 of apertures

Figure 13:
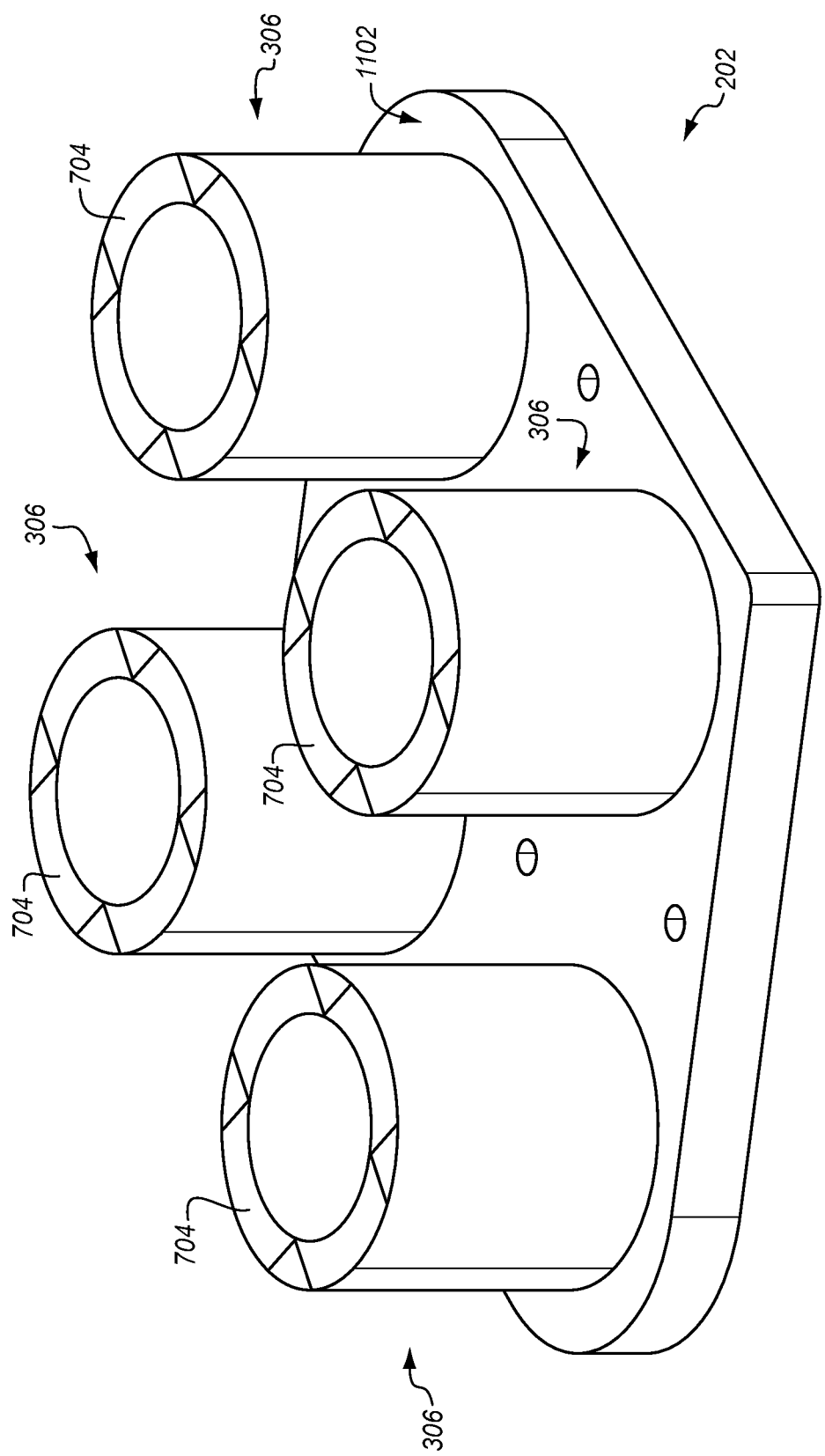

206. To do so, a plurality of cylindrical walls 704 are formed, each at perimeter 1110 of one of apertures 206 and vertically extending from top surface 1102 of base plate 202 to terminate at end 710 (see step 1204). For example, cylindrical walls 704 may be built layer by layer from top surface 1102 of base plate 202. FIG. 13 is the result of performing step 1204.

In response for forming downstream member 306 on base plate 202, the AM process continues through a third series of manufacturing steps to concurrently form a plurality of ejector members 304. To do so, a plurality of conical walls 314 are formed, one on each end 710 of cylindrical walls 704. Conical walls 314 vertically extend from end 710 away from top surface 1102 and surround a portion 508 of helical shape 108. Each of the conical walls 314 increases in diameter away from top surface 1102 and terminates at end 608. Further, each of conical walls 314 includes at least one aperture 318 that extends through a side wall 614 (see step 1206). For example, conical walls 314 and portion 508 of helical shape 108 may be built layer by layer from end 710 of downstream member 306. FIG. 14 is the result of performing step 1206.

In response to forming ejector members 304 on downstream members 306, the AM process continues through a fourth series of manufacturing steps to concurrently form a plurality of upstream members 302 on ejector members 304. To do so, a plurality of cylindrical walls 312 are formed, each one on end 608 of one of conical walls 314. Cylindrical walls 312 vertically extend from end 608 away from top surface 1102. Further, each of cylindrical walls 312 surrounds portion 510 of helical shape 108 (see step 1208). For example, cylindrical walls 312 and portion 510 of helical shape 108 may be built layer by layer from end 408 to end 308. FIG. 9 is the result of performing step 1208.

Using an AM process, monolithic array 200 is fabricated as one continuous part, which may then be used to from a larger inlet assembly 1000 of separators 102 placed upstream of engine inlet 116, providing clean air 112 to engine 106. The AM process is quick and easily modified, and requires little to no tooling. Since monolithic array 200 is composed of a single part, maintaining an inventory of multiple parts is no longer needed. This simplifies the accounting, inventory, and procurement process. Further, if a portion of inlet assembly 1000 is damaged during operation of aircraft 100, then inlet assembly 1000 may be quickly repaired by removing and replacing any damaged monolithic array 200 portions of inlet assembly 1000.

Although specific embodiments were described herein, the scope is not limited to those specific embodiments. Rather, the scope is defined by the following claims and any equivalents thereof

What is claimed is:

1. A method, comprising:
additively forming, using a first series of manufacturing steps, a base plate that includes a top surface, a bottom surface, and a plurality of first apertures extending through the base plate from the top surface to the bottom surface;
additively forming, using a second series of the manufacturing steps, a plurality of first cylindrical walls, each formed at a perimeter of one of the first apertures and vertically extending from the top surface to terminate at a first end;
additively forming, using a third series of the manufacturing steps, a plurality of conical walls, each formed on the first end of one of the first cylindrical walls and vertically extending from the first end away from the top surface and surrounding a first portion of a helical shape, wherein each of the conical walls increases in diameter away from the top surface and terminates at a second end, wherein each of the conical walls includes at least one second aperture that extends through a side wall; and
additively forming, using a fourth series of the manufacturing steps, a plurality of second cylindrical walls, each formed on the second end of one of the conical walls and vertically extending from the second end away from the top surface, wherein each of the second cylindrical walls surrounds a second portion of the helical shape,
wherein the helical shape comprises a plurality of fins that extend along a centerline of the second cylindrical walls.

2. The method of claim 1, wherein:
the at least one second aperture has a shape of a triangle.

3. The method of claim 2, wherein:
a base of the triangle is proximate to the first end of the first cylindrical walls.

4. The method of claim 1, wherein:
the plurality of fins radiate from a centerline of the helical shape.

5. The method of claim 1, wherein:
the manufacturing steps comprise additively forming features using direct metal laser sintering.

6. The method of claim 1, wherein:
the helical shape terminates at an inside surface of the conical walls between two or more of the at least one second aperture.

7. An apparatus, comprising:
a base plate that includes a top surface, a bottom surface, and a plurality of first apertures extending through the base plate from the top surface to the bottom surface;
a plurality of first cylindrical walls, each integrated around a perimeter of one of the first apertures and vertically extending from the top surface to terminate at a first end;
a plurality of conical walls, each integrated onto the first end of one of the first cylindrical walls and vertically extending from the first end away from the top surface and surrounding a first portion of a helical shape, wherein each of the conical walls increases in diameter away from the top surface and terminates at a second end, wherein each of the conical walls includes at least one second aperture that extends through a side wall; and
a plurality of second cylindrical walls, each integrated onto the second end of one of the conical walls and vertically extending from the second end away from the top surface, wherein each of the second cylindrical walls surrounds a second portion of the helical shape,
the helical shape comprises a plurality of fins that extend along a centerline of the second cylindrical walls.

8. The apparatus of claim 7, wherein:
the at least one second aperture has a shape of a triangle.

9. The apparatus of claim 8, wherein:
a base of the triangle is proximate to the first end of the first cylindrical walls.

10. The apparatus of claim 7, wherein:
the plurality of fins radiate from a centerline of the helical shape.

11. The apparatus of claim 7, wherein:
the first apertures have a diameter between 0.5 inches and 1 inch.

12. The apparatus of claim 7, wherein:
the second cylindrical walls have an inside diameter between 0.75 inches and 1.25 inches.

13. The apparatus of claim 12, wherein:
the helical shape includes a portion that is a component of an ejector member.

14. The apparatus of claim 7, wherein:
the helical shape rotates approximately 180 degrees along its length.

15. The apparatus of claim 7, wherein:
the helical shape terminates at an inside surface of the conical walls between two or more of the at least one second aperture.

16. The apparatus of claim 7, wherein:
the plurality of fins are configured to rotate at a progressive rate along a length of the helical shape.

17. The apparatus of claim 7, wherein:
the plurality of fins are configured to each rotate one half of a revolution along a length of the helical shape.

18. The apparatus of claim 7, wherein:
the helical shape is configured to move air.

19. The apparatus of claim 7, wherein:
the base plate is square in shape.

20. The apparatus of claim 7, wherein:
the apparatus is disposed at an inlet assembly.

21. The apparatus of claim 20, wherein:
the apparatus is one of multiple modular elements at the inlet assembly.

22. The apparatus of claim 7, wherein:
the apparatus is configured to provide clean air to an engine inlet.

23. The apparatus of claim 22, wherein:
the engine inlet is disposed at a gas turboshaft engine.

24. The apparatus of claim 7, wherein:
the apparatus is configured to discharge particulate-rich air.

25. The apparatus of claim 7, wherein:
the apparatus is configured to remove particulate matter from contaminated air that is bound for a gas turboshaft engine.

26. The apparatus of claim 7, wherein:
the helical shape includes a portion that is a component of an upstream member.

27. The apparatus of claim 7, wherein:
the apparatus is monolithic.

28. The apparatus of claim 7, wherein:
the at least one first aperture has a shape of a circle.

29. A method, comprising:
additively forming, using a first series of manufacturing steps, a first cylindrical wall extending along a length to terminate at a first end;
additively forming, using a second series of the manufacturing steps, a conical wall on the first end of the first cylindrical wall that vertically extends from the first end and surrounds a first portion of a helical shape, wherein the conical wall increases in diameter away from the first end and terminates at a second end, wherein the conical wall includes at least one aperture that extends through a side wall; and
additively forming, using a third series of the manufacturing steps, a second cylindrical wall on the second end of the conical wall that vertically extends from the second end and surrounds a second portion of the helical shape,
wherein the helical shape comprises a plurality of fins that extend along a centerline of the second cylindrical wall.

30. The method of claim 29, wherein:
the at least one aperture has a shape of a triangle.

31. The method of claim 30, wherein:
a base of the triangle is proximate to the first end of the first cylindrical wall.

32. The method of claim 29, wherein:
the plurality of fins radiate from a centerline of the helical shape.

33. The method of claim 29, wherein:
the manufacturing steps comprise additively forming features using direct metal laser sintering.

34. The method of claim 29, wherein:
the helical shape terminates at an inside surface of the conical wall between two or more of the at least one aperture.

* * * * *